US012799356B2

(12) United States Patent
Matsuzaki et al.

(10) Patent No.: US 12,799,356 B2
(45) Date of Patent: Nov. 17, 2026

(54) CURABLE SILICONE COMPOSITION, ENCAPSULANT AND OPTICAL SEMICONDUCTOR DEVICE

(71) Applicant: DuPont Toray Specialty Materials Kabushiki Kaisha, Tokyo (JP)

(72) Inventors: Mayumi Matsuzaki, Chiba (JP); Shunya Takeuchi, Chiba (JP)

(73) Assignees: DuPont Toray Specialty Materials Kabushiki Kaisha, Tokyo (JP); Duroptix Materials Kabushiki Kaisha, Tokyo (JP)

( * ) Notice: Subject to any disclaimer, the term of this patent is extended or adjusted under 35 U.S.C. 154(b) by 39 days.

(21) Appl. No.: 17/347,861

(22) Filed: Jun. 15, 2021

(65) Prior Publication Data

US 2022/0049121 A1 Feb. 17, 2022

(30) Foreign Application Priority Data

Aug. 14, 2020 (JP) ................................. 2020-136991

(51) Int. Cl.
*C08L 83/04* (2006.01)
*C09D 183/04* (2006.01)

(52) U.S. Cl.
CPC ............ *C09D 183/04* (2013.01); *C08L 83/04* (2013.01)

(58) Field of Classification Search
CPC ........ C08G 77/12; C08G 77/20; C08G 77/80; C08L 83/04; B01J 23/40; C09D 183/04
USPC ...................................... 528/15, 31; 525/478
See application file for complete search history.

(56) References Cited

U.S. PATENT DOCUMENTS

| | | | | |
|---|---|---|---|---|
| 3,715,334 A | 2/1973 | Karstedt | | |
| 3,884,950 A * | 5/1975 | Koda | C08K 5/54 | 508/213 |
| 5,715,334 A * | 2/1998 | Peters | G06T 5/50 | 382/254 |
| 9,343,570 B2 | 5/2016 | Yamazaki et al. | | |
| 9,362,468 B2 | 6/2016 | Ko et al. | | |
| 9,403,967 B2 | 8/2016 | Onai | | |
| 9,453,158 B2 | 9/2016 | Sagawa et al. | | |
| 9,598,576 B2 | 3/2017 | Okawa et al. | | |
| 9,909,007 B2 * | 3/2018 | Chon | C08L 83/04 | |
| 11,248,091 B2 | 2/2022 | Hayashi et al. | | |
| 2004/0013247 A1 | 1/2004 | Kurokawa | | |
| 2007/0112147 A1 * | 5/2007 | Morita | C08L 83/04 | 524/588 |
| 2019/0268466 A1 | 8/2019 | Inoue | | |
| 2020/0332122 A1 * | 10/2020 | Kim | C08L 83/04 | |

FOREIGN PATENT DOCUMENTS

| | | | | |
|---|---|---|---|---|
| CN | 102464887 | A | | 5/2012 |
| CN | 104411771 | A | | 3/2015 |
| CN | 109790385 | A | | 5/2019 |
| CN | 109890899 | A | | 6/2019 |
| CN | 111344369 | | * | 6/2020 |
| JP | 2002185614 | A | | 6/2002 |
| JP | 2004056235 | A | | 2/2004 |
| JP | 2012251116 | A | | 12/2012 |
| JP | 2014156532 | A | | 8/2014 |
| JP | 2014221880 | A | | 11/2014 |
| JP | 2015524503 | A | | 8/2015 |
| JP | 2016124967 | A | | 7/2016 |
| JP | 2017039848 | A | | 2/2017 |
| WO | 2015033979 | A1 | | 3/2015 |
| WO | 2018020943 | A1 | | 2/2018 |

OTHER PUBLICATIONS

"Karstedt Catalyst" from Johnson Matthey website (Year: 2025).*
English language abstract and machine-assisted English translation for JP 2002-185614 A extracted from espacenet.com database on Jun. 17, 2021, 5 pages.
English language abstract for JP 2004-056235 A extracted from espacenet.com database on Jun. 17, 2021, 2 pages.
English language abstract and machine-assisted English translation for JP 2012-251116 A extracted from espacenet.com database on Jun. 17, 2021, 14 pages.
English language abstract for JP 2014-156532 A extracted from espacenet.com database on Jun. 17, 2021, 2 pages.
English language abstract for JP 2014-221880 A extracted from espacenet.com database on Jun. 17, 2021, 2 pages.
English language abstract for JP 2015-524503 A extracted from espacenet.com database on Jun. 17, 2021, 1 page.
English language abstract and machine-assisted English translation for JP 2017-039848 A extracted from espacenet.com database on Jun. 17, 2021, 12 pages.

(Continued)

*Primary Examiner* — Margaret G Moore
(74) *Attorney, Agent, or Firm* — Howard & Howard Attorneys PLLC

(57) ABSTRACT

A curable silicone composition is provided that exhibits excellent wetting properties on glass substrates and that forms a cured product that has a smooth surface. The curable silicone composition comprises: (A-1) a resinous alkenyl group-containing organopolysiloxane in which aryl groups account for more than 30 mol % of all silicon atom-bonded functional groups; (A-2) a linear alkenyl group-containing organopolysiloxane in which aryl groups account for more than 30 mol % of all silicon atom-bonded functional groups; (B) a linear organopolysiloxane or a cerium-containing organopolysiloxane, in which aryl groups account for no more than 30 mol % of all silicon atom-bonded functional groups, contained in an amount of no more than 2% by mass based on the total mass of all organopolysiloxane components; (C) an organohydrogenpolysiloxane including at least 2 silicon atom-bonded hydrogen atoms per molecule, that is different from component (B); and (D) a catalyst for hydrosilylation reaction.

18 Claims, No Drawings

(56) References Cited

OTHER PUBLICATIONS

English language abstract for WO 2018/020943 A1 extracted from espacenet.com database on Jun. 17, 2021, 1 page.
English language abstract for WO 2015/033979 A1 extracted from espacenet.com database on Jun. 13, 2024, 2 pages.
English language abstract and machine-assisted English translation for CN 1024648877 A extracted from espacenet.com and Google Patent databases on May 2, 2025, 12 pages.
English language abstract and machine-assisted English translation for CN 104411771 A extracted from espacenet.com database on May 2, 2025, 25 pages.
English language abstract and machine-assisted English translation for CN 109790385 A extracted from espacenet.com and Google Patent databases on May 2, 2025, 11 pages.
English language abstract for CN 109890899 A extracted from espacenet.com database on May 2, 2025, 1 page.
English language abstract and machine-assisted English translation for JP 2016-124967 A extracted from espacenet.com database on May 7, 2025, 29 pages.
Machine-assisted English language abstract and translation for and original Chinese language document of Liu, Yutian, "Addition Silicone Rubber Adhesive", World Rubber Industry, 2009, 13 pages.
Zhao, Miao et al., "Synthesis of an Adhesion-Enhancing Polysiloxane Containing Epoxy Groups for Addition-Cure Silicone Light Emitting Diodes Encapsulant", Polym. Adv. Technol., vol. 25, 2014, pp. 927-933.

* cited by examiner

CURABLE SILICONE COMPOSITION, ENCAPSULANT AND OPTICAL SEMICONDUCTOR DEVICE

CROSS-REFERENCE TO RELATED APPLICATIONS

The present application claims priority to and all the benefits of Japanese Application No. 2020-136991 filed on Aug. 14, 2020, which is hereby expressly incorporated herein by reference in its entirety.

TECHNICAL FIELD

The present disclosure relates to a curable silicone composition, and more specifically relates to a curable silicone composition that is suitable for use in encapsulants for optical semiconductor devices. The present disclosure also relates to an optical semiconductor device sealed with an encapsulant comprising a cured product of the curable silicone composition.

BACKGROUND ART

When curable silicone compositions are cured, they form cured products having excellent heat resistance, weather resistance, and transparency, and are therefore widely used as optical materials.

For example, patent document 1 discloses a curable resin composition, characterized in that, to 100 parts by mass of a primary agent (X) (refractive index Rh) consisting of at least one of a silicone resin, a modified silicone resin, an epoxy resin, and a modified epoxy resin, is added and dispersed more than 0 parts by mass to no more than 100 parts by mass of an additive (Y) that consists of at least one of a silicone resin, a modified silicone resin, an epoxy resin, and a modified epoxy resin and that has a refractive index (refractive index Rh) different from that of the primary agent (X), wherein the difference in refractive indices between the primary agent (X) and the additive (Y) in an uncured state is $|R\ I_x - R\ I_y| \geq 0.0050$.

Patent document 2 also discloses a curable composition, characterized by comprising: (A) a polyorganosiloxane having an average composition formula of chemical formula 1: $(R^1_3SiO_{1/2})_a(R^1_2SiO_{2/2})_b(R^1SiO_{3/2})_c(SiO_{4/2})$d, (B) a polyorganosiloxane having an average composition formula of chemical formula 2: $(R^2_3SiO_{1/2})_c(R^2_2SiO_{2/2})_f(R^2SiO_{3/2})_g(SiO_{4/2})_h$; and (C) a compound of chemical formula 3 missing number 1?, wherein the mathematical expression 1: |A−B}>0.03 is satisfied (in chemical formulas 1 through 3, $R^1$, $R^2$, and Y are each independent epoxy groups or monovalent hydrocarbon groups, at least one of $R^1$ or at least one of $R^2$ is an alkenyl group, a is 0 or a positive number, b is a positive number, c is 0 or a positive number, d is 0 or a positive number, b/(b+c+d) is 0.65 or more, e is 0 or a positive number, f is 0 or a positive number, g is 0 or a positive number, h is 0 or a positive number, f/(f+g+h) is 0.65 or more, g and h are not 0 at the same time, i is 0.2 to 1, and j is 0.9 to 2; and in mathematical expression 1, A is the refractive index of any of components (A) through (C), and B is the refractive index of a mixture of the other two components of components (A) through (C)).

Patent document 3 discloses a silicone gel composition, characterized by comprising: (A) a mixture of organopolysiloxanes having at least 2 silicon atom-bonded alkenyl groups per molecule, that are represented by average composition formula (1): $R^1_aR^2_bSiO_{(4-a-b)/2}$ (in the formula, $R^1$ represents an alkenyl group, $R^2$ represents an optionally substituted monovalent hydrocarbon group containing no aliphatic unsaturated bonds, a is a positive number satisfying 0.0001 to 0.2, and b is a positive number satisfying 1.7 to 2.2, however a+b is a positive number satisfying 1.9 to 2.4) and that have different refractive indices, where the difference in refractive indices at 25° C. between the organopolysiloxanes contained in the mixture of organopolysiloxanes is 0.05 to 0.12; (B) an organohydrogensiloxane having at least 2 silicon atom-bonded hydrogen atoms per molecule, that is represented by the following average composition formula (2): $H_cR^3_dSiO_{(4-c-d)/2}$ (in the formula, $R^3$ represents an optionally substituted monovalent hydrocarbon group having no aliphatic unsaturated bonds, c is a positive number satisfying 0.001 to 1.0, and d is a positive number satisfying 0.5 to 2.2, however c+d is a positive number satisfying 0.72 to 2.5) in an amount resulting in 0.1 to 5 mols of silicon atom-bonded hydrogen atoms per mol silicon atom-bonded alkenyl groups in component (A); and an effective amount of (C) a platinum-based catalyst, wherein the penetration level of the cured product of the silicone gel composition is 10 to 200, as determined by JIS K 2207.

Patent document 4 discloses a curable organopolysiloxane composition, characterized by comprising: (A-1) an organopolysiloxane represented by average unit formula (1): $(R^1SiO_{3/2})_a(R^1_2SiO_{2/2})_b(R^1_3SiO_{1/2})_c(SiO_{4/2})_d$ (in the formula, $R^1$ independently represents any of $C_{1-7}$ alkyl groups, $C_{2-6}$ alkenyl groups, and hydroxyl groups, but there are at least 2 $C_{2-6}$ alkenyl groups per molecule, $0 \leq a \leq 0.8$, $0<b<1$, $0 \leq c \leq 0.8$, $0 \leq d \leq 0.8$, and a+b+c+d=1); (A-2) an organopolysiloxane represented by the following average unit formula (2): $(R^2SiO_{3/2})_a(R^2_2SiO_{2/2})_{b1}(R^2R^3SiO^{2/2})^{b2}(R^2_3SiO_{1/2})_c(SiO_{4/2})_d$ (in the formula, $R^2$ independently represents any of $C_{1-7}$ alkyl groups, $C_{2-6}$ alkenyl groups, $C_{6-12}$ aryl groups, and hydroxyl groups, and $R^3$ independently represents any of $C_{1-7}$ alkyl groups, $C_{2-6}$ alkenyl groups, and hydroxyl groups, but there are at least 2 $C_2$-6 alkenyl groups per molecule and at least 2 $C_{6-12}$ aryl groups per molecule, a, c, and d are the same as above, $0<b1<1$, $0 \leq b2<1$, and a+b1+b2+c+d=1); (B) an organohydrogenpolysiloxane having 2 or more silicon atoms to which hydrogen atoms are directly bonded per molecule; (C) a catalyst for hydrosilylation reaction; and (D) a pigment or dye, wherein the absolute difference in refractive indices at 25° C. between component (A-1) and component (A-2) at 589 nm is 0.05 or more, as determined by the method described in JIS K 0062:1992.

Patent document 5 discloses a curable silicone composition comprising at least: (A) an organopolysiloxane having at least 2 alkenyl groups per molecule; (B) a linear organopolysiloxane represented by a specific general formula; (C) an organopolysiloxane having at least 2 silicon atom-bonded hydrogen atoms per molecule; (D) a phosphor; and (E) a catalyst for hydrosilylation reaction, and indicates that no wrinkles at all were observed on the surface of the cured product of the curable silicone composition, and that the cured product was exceptionally flat.

In recent years, high transparency and a high refractive index have been required of silicone encapsulants used in optical semiconductor devices such as light emitting diodes (LEDs) in order to achieve higher light extraction efficiency. Curable silicone compositions that contain an organopolysiloxane having an aryl group in the molecular chain are commonly used in order to provide silicone encapsulants with a high refractive index. However, conventional curable silicone compositions having a high refractive index do not have sufficient wettability on glass substrates, and a problem encountered with cured products formed from conventional curable silicone compositions having a high refractive index is that wrinkles are formed on the surface, resulting in insufficient smoothness.

PRIOR ART DOCUMENT

Patent Documents

[Patent document 1] Japanese Unexamined Patent Publication No. 2014-221880
[Patent Document 2] Japanese Translation of PCT International Application Publication No. 2015-524503
[Patent document 3] Japanese Unexamined Patent Publication No. 2012-251116
[Patent document 4] Japanese Unexamined Patent Publication No. 2017-39848
[Patent document 5] Japanese Unexamined Patent Publication No. 2014-156532

SUMMARY OF THE INVENTION

Problem to be Solved by the Invention

An object of the present disclosure is to provide a curable silicone composition that is capable of exhibiting excellent wetting properties on glass substrates and that can form a cured product that has a smooth surface.

Another object of the present disclosure is to provide an encapsulant including the curable silicone composition of the present disclosure. Yet another object of the present disclosure is to provide an optical semiconductor device that is sealed with the encapsulant of the present disclosure.

Means for Solving the Problems

As a result of extensive research to solve the above problems, the present inventors arrived at the present disclosure upon the surprising discovery that the wetting properties on glass substrates can be improved and a cured product that has a smooth surface on which wrinkling is prevented can be formed by adding a small amount of a linear organopolysiloxane or a cerium-containing organopolysiloxane, in which aryl groups account for no more than 30 mol % of all silicon atom-bonded functional groups, to an aryl group-containing curable silicone composition capable of forming a cured product having a high refractive index.

The present disclosure thus relates to a UV curable silicone composition, comprising:

(A-1) a resinous alkenyl group-containing organopolysiloxane in which aryl groups account for more than 30 mol % of all silicon atom-bonded functional groups;

(A-2) a linear alkenyl group-containing organopolysiloxane in which aryl groups account for more than 30 mol % of all silicon atom-bonded functional groups;

(B) a linear organopolysiloxane or a cerium-containing organopolysiloxane, in which aryl groups account for no more than 30 mol % of all silicon atom-bonded functional groups, contained in an amount of no more than 2% by mass based on the total mass of all organopolysiloxane components;

(C) an organohydrogenpolysiloxane including at least 2 silicon atom-bonded hydrogen atoms per molecule, that is different from component (B); and (D) a catalyst for hydrosilylation reaction.

The content of organopolysiloxane components (A-1) and (A-2) is preferably 30 to 90% by mass based on the total mass of all organopolysiloxane components in the composition.

Organopolysiloxane component (B) preferably has a number-average molecular weight of 500 or more.

The content of organopolysiloxane component (B) is preferably 1.5% by mass or less based on the total mass of all organopolysiloxane components.

Organohydrogenpolysiloxane component (C) preferably contains silicon atom-bonded aryl groups, and the aryl groups preferably account for 5 to 50 mol % of all silicon atom-bonded functional groups of component (C).

The content of organohydrogenpolysiloxane component (C) is preferably 5% by mass or more based on the total mass of all organopolysiloxane components.

The present disclosure also relates to an encapsulant comprising the curable silicone composition according to the present disclosure.

The present disclosure also relates to an optical semiconductor device that is equipped with the encapsulant according to the present disclosure.

Effects of the Invention

The curable silicone composition according to the present application is capable of exhibiting excellent wetting properties on glass substrates and can form a cured product that has a smooth surface. The encapsulant according to the present disclosure comprises the curable silicone composition of the present disclosure and thus allows an optical semiconductor to be sealed with a cured product that has a smooth surface on which wrinkling has been prevented.

Mode for Carrying Out the Invention

Curable Silicone Composition

The UV curable silicone composition according to the present disclosure comprises (A-1) a resinous alkenyl group-containing organopolysiloxane in which aryl groups account for more than 30 mol % of all silicon atom-bonded functional groups;

(A-2) a linear alkenyl group-containing organopolysiloxane in which aryl groups account for more than 30 mol % of all silicon atom-bonded functional groups;

(B) a linear organopolysiloxane or a cerium-containing organopolysiloxane, in which aryl groups account for no more than 30 mol % of all silicon atom-bonded functional groups, contained in an amount of no more than 2% by mass based on the total mass of all organopolysiloxane components;

(C) an organohydrogenpolysiloxane including at least 2 silicon atom-bonded hydrogen atoms per molecule, that is different from component (B); and (D) a catalyst for hydrosilylation reaction.

The components of the curable silicone composition of the present disclosure are described in detail below.

(A) Alkenyl group-containing organopolysiloxane in which aryl groups account for more than 30 mol % of all silicon atom-bonded functional groups Component (A) is an alkenyl group-containing organopolysiloxane in which aryl groups account for more than 30 mol % of all silicon atom-bonded functional groups. Component (A) includes (A-1) a resinous alkenyl group-containing organopolysiloxane in which aryl groups account for more than 30 mol % of all silicon atom-bonded functional groups and (A-2) a linear alkenyl group-containing organopolysiloxane in which aryl groups account for more than 30 mol % of all silicon atom-bonded functional groups The proportion of aryl groups in all silicon atom-bonded functional groups of organopolysiloxane component (A) is more than 30 mol %, preferably 32 mol % or more, more preferably 35 mol % or more, even more preferably 39 mol % or more, preferentially 42 mol % or more, and in particular is preferably 45 mol % or more. The proportion of aryl groups in all silicon atom-bonded functional groups can be determined by analysis such as Fourier transform infrared spectrophotometry (FT-IR) or nuclear magnetic resonance (NMR).

Examples of the weight-average molecular weight of organopolysiloxane component (A) include, but are not particularly limited to, 1,000 to 100,000. The weight-average molecular weight can be determined by GPC.

Examples of alkenyl groups in component (A) include $C_{2-12}$ alkenyl groups such as vinyl, allyl, butenyl, pentenyl, hexenyl, heptenyl, octenyl, nonenyl, decenyl, undecenyl, and dodecenyl groups, and vinyl groups are preferred.

Examples of aryl groups in the organopolysiloxane component (A) include, but are not particularly limited to, $C_{6-20}$ aryl groups, such as phenyl, tolyl, xylyl, and naphthyl groups, and preferably phenyl groups.

Examples of silicon atom-bonded groups other than alkenyl and aryl groups in organopolysiloxane component (A) include optionally halogen-substituted monovalent hydrocarbon groups other than alkenyl and aryl groups, for example, $C_{1-12}$ alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; $C_{7-20}$ aralkyl groups such as benzyl, phenethyl and phenylpropyl groups; and any of these groups in which some or all of the hydrogen atoms are substituted with halogen atoms such as fluorine, chlorine, and bromine atoms. The silicon atoms in component (A) may have a small quantity of hydroxyl groups or alkoxy groups such as a methoxy group or ethoxy group within a range that does not hinder the objectives of the present disclosure. Silicon atom-bonded groups other than alkenyl groups in component (A) are preferably selected from among $C_{1-6}$ alkyl groups, particularly methyl groups.

Examples of the alkenyl group content as a proportion of all silicon atom-bonded organic groups in component (A) include, but are not particularly limited to, 0.5 mol % or more, preferably 1 mol % or more, and more preferably 2 mol % or more to 70 mol % or less, preferably 60 mol % or less, and more preferably 50 mol % or less of the total of silicon atom-bonded organic groups. The alkenyl group content can be determined by means of analysis such as Fourier transform infrared spectrophotometry (FT-IR) or nuclear magnetic resonance (NMR), or by means of a titration method described below.

A method for determining the alkenyl group amount in the components by means of titration will be described. The alkenyl group content in the organopolysiloxane components can be accurately quantified by means of a titration method generally known as the Wijs method. The principle will be described below. Firstly, alkenyl groups in the organopolysiloxane starting material and iodine monochloride are subjected to addition reaction as shown in formula (1). Next, according to the reaction shown in formula (2), an excess amount of iodine monochloride is reacted with potassium iodide, thereby freeing iodine. The freed iodine is subjected to titration with a sodium thiosulfate solution.

$$CH_2{=}CH{-}+2IC1 \rightarrow CH_2I{-}CHC1{-}+IC1 \text{ (excess)} \quad \text{Formula(1):}$$

$$IC1+KI \rightarrow 2+KC1 \quad \text{Formula (2):}$$

The alkenyl group amount in the component can be quantified from the difference between the amount of sodium thiosulfate required for titration and the titration amount of the blank solution prepared separately.

Examples of the content of the alkenyl group-containing organopolysiloxanes in which aryl groups represent more than 30 mol % of all silicon atom-bonded functional groups in component (A) include, but are not particularly limited to, preferably 40% by mass or more, more preferably 50% by mass or more, even more preferably 60% by mass or more, and in particular preferably 70% by mass or more, based on the total mass of all organopolysiloxane components included in the curable silicone composition of the present disclosure. The content of component (A) is also preferably 95% by mass or less, more preferably 90% by mass or less, even more preferably 85% by mass or less, and in particular preferably 80% by mass or less, based on the total mass of all organopolysiloxane components.

The (A-1) resinous alkenyl group-containing organopolysiloxane in which aryl groups account for more than 30 mol % of all silicon atom-bonded functional groups and (A-2) the linear alkenyl group-containing organopolysiloxane in which aryl groups account for more than 30 mol % of all silicon atom-bonded functional groups are described in greater detail below.

(A-1) Resinous alkenyl group-containing organopolysiloxane in which aryl groups account for more than 30 mol % of all silicon atom-bonded functional groups Component (A-1) is a resinous alkenyl group-containing organopolysiloxane in which aryl groups account for more than 30 mol % of all silicon atom-bonded functional groups. Component (A-1) may be one kind of resinous alkenyl group-containing organopolysiloxane or a mixture of two or more kinds of resinous alkenyl group-containing organopolysiloxanes.

In the present specification, resinous organopolysiloxanes refer to organopolysiloxanes that have a branched or network molecular structure. In one embodiment, the molecular structure of the resinous organopolysiloxane of component (A-1) contains at least one siloxane unit (unit T) represented by $RSiO_{3/2}$ and/or siloxane unit (unit Q) represented by $SiO_{4/2}$. In a preferred embodiment of the present disclosure, the resinous organopolysiloxane of component (A-1) contains T units and may or may not contain, but preferably does not contain, Q units.

In one embodiment, component (A-1) of the present disclosure can be a resinous organopolysiloxane represented by average unit formula (I): $(R^1{}_3SiO_{1/2})a(R^1{}_2SiO_{2/2})b(R^1SiO_{3/2})c(SiO_{4/2})d(XO_{1/2})e$ (in the formula, $R^1$ indicates the same or different optionally halogen-substituted monovalent hydrocarbon groups, but at least two $R^1$ per molecule are alkenyl groups, X is a hydrogen atom or an alkyl group, and a, b, c, d, and e are numbers satisfying the following: $0 \leq a \leq 1.0$, $0 \leq b \leq 1.0$, $0 \leq c < 0.9$, $0 \leq d < 0.5$, $0 \leq e < 0.4$, a=b=c=d=1.0, and c+d>0).

Examples of optionally halogen-substituted monovalent hydrocarbon groups of IV in the above formula (I) include: $C_{1-12}$ alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; $C_{6-20}$ aryl groups such as phenyl, tolyl, xylyl, and naphthyl groups; $C_{7-20}$ aralkyl groups such as benzyl, phenethyl, and phenylpropyl groups; $C_{2-12}$ alkenyl groups such as vinyl, allyl, butenyl, pentenyl, hexenyl, heptenyl, octenyl, nonenyl, decenyl, undecenyl, and dodecenyl groups; and any of these groups in which some or all of the hydrogen atoms are substituted with halogen atoms such as fluorine, chlorine, and bromine atoms. IV may also be a hydroxyl group or an alkoxy group such as methoxy or ethoxy, in small amounts, provided that the object of the present disclosure is not thereby compromised. Preferred examples of alkyl groups represented by X include $C_{1-3}$ alkyl groups, specifically, methyl, ethyl, and propyl groups.

In formula (I), a is preferably in the range of 0≤a≤0.9, more preferably in the range of 0≤0.7, and particularly in the range of 0≤a≤0.5. In formula (I), b is preferably in the range of 0≤b≤0.5, more preferably in the range of 0≤b≤0.3, and particularly in the range of 0≤b≤0.1. In formula (I), c is preferably in the range of 0≤c≤0.85, and more preferably in the range of 0≤c≤0.8. In formula (I), d is preferably in the range of 0≤d≤0.4, more preferably in the range of 0≤d≤0.25, and even more preferably in the range of 0≤d≤0.1. In formula (I), e is preferably in the range of 0≤e≤0.3, more preferably in the range of 0≤e≤0.2, and particularly in the range of 0≤e≤0.1.

In one embodiment, the resinous alkenyl group-containing organopolysiloxane of formula (I) contains siloxane units (M units) represented by $R_3SiO_{1/2}$ and siloxane units (T units) represented by $RSiO_{3/2}$. Specifically, in this embodiment, a in formula (I) is greater than 0, is preferably 0.1 or more, and is more preferably 0.2 or more. Also, c in formula (I) is greater than 0, is preferably 0.2 or more, is more preferably 0.4 or more, and is even more preferably 0.6 or more. In another embodiment, the resinous organopolysiloxane of formula (I) consists of only M units and T units, that is, b and d in formula (I) are 0.

In a preferred embodiment of the present disclosure, the resinous alkenyl group-containing organopolysiloxane of component (A-1) includes terminal alkenyl groups. The resinous organopolysiloxane of component (A-1) preferably has alkenyl groups in the siloxane units (M units) represented by $SiO_{1/2}$, and may or may not, and preferably does not, have alkenyl groups in molecular side chains (i.e., siloxane units (D units) represented by $SiO_{2/2}$ and siloxane units (T units) represented by $SiO_{3/2}$).

In a preferred embodiment of the present disclosure, the resinous alkenyl group-containing organopolysiloxane of component (A-1) has aryl groups in molecular side chains and no terminal aryl groups. Specifically, the resinous organopolysiloxane of component (A-1) preferably has aryl groups in the D units and T units, and more preferably has aryl groups in only the T units and no aryl groups in the M units.

The content of component (A-1) is not particularly limited, but is preferably 30% by mass or more, more preferably 40% by mass or more, even more preferably 50% by mass or more, and in particular is preferably 55% by mass or more, based on the total mass of all organopolysiloxane components included in the curable silicone composition of the present disclosure. The content of component (A-1) is also preferably 90% by mass or less, more preferably 85% by mass or less, even more preferably 80% by mass or less, and in particular is preferably 75% by mass or less, based on the total mass of all organopolysiloxane components.

s (A-2) Linear alkenyl group-containing organopolysiloxane in which aryl groups account for more than 30 mol % of all silicon atom-bonded functional groups Component (A-2) is a linear alkenyl group-containing organopolysiloxane in which aryl groups account for more than 30 mol % of all silicon atom-bonded functional groups. Component (A-2) may be one kind of linear alkenyl group-containing organopolysiloxane or a mixture of two or more kinds of linear alkenyl group-containing organopolysiloxanes.

In one embodiment of the present disclosure, component (A-2) can be a linear alkenyl group-containing organopolysiloxane represented by average structural formula (II): $R^1_3SiO(R^1_2SiO)mSiR^1_3$ (in the formula, $R^1$ is the same as in formula (I), except that at least two $R^1$ per molecule are alkenyl groups, and more than 30 mol % of $R^1$ are aryl groups, where m is a positive number of 5 to 1,000).

In another embodiment of the present disclosure, the linear alkenyl group-containing organopolysiloxane of formula (II) is preferably a linear organopolysiloxane in which both ends of the molecular chain are blocked with alkenyl groups, and specifically, can be represented by the following average structural formula (III)

$$R^2R^3_2SiO(R^3_2SiO)mSiOR^3_2R^2 \qquad \text{formula (III):}$$

(in the formula, $R^2$ is an alkenyl group, $R^3$ is an optionally halogen-substituted monovalent hydrocarbon other than an alkenyl group, but $R^3$ represents aryl groups in an amount such that aryl groups account for more than 30 mol % of all silicon atom-bonded functional groups, and m is an integer of 5 to 1,000).

Examples of alkenyl groups of formula (III) include $C_{2-12}$ alkenyl groups such as vinyl, allyl, butenyl, pentenyl, hexenyl, heptenyl, octenyl, nonenyl, decenyl, undecenyl, and dodecenyl groups; $C_{2-6}$ alkenyl groups are preferred, and vinyl groups are particularly preferred.

Examples of optionally halogen-substituted monovalent hydrocarbon groups other than alkenyl groups in formula (III) include $C_{1-12}$ alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; $C_{6-20}$ aryl groups such as phenyl, tolyl, xylyl, and naphthyl groups; $C_{7-20}$ aralkyl groups such as benzyl, phenethyl, and phenylpropyl groups; and any of these groups in which some or all of the hydrogen atoms are substituted with halogen atoms such as fluorine, chlorine, and bromine atoms.

In formulas (II) and (III), m is 5 or more, preferably 10 or more, more preferably 15 or more, and even more preferably 20 or more. In formulas (II) and (III), m is 1,000 or less, preferably 500 or less, more preferably 300 or less, and even more preferably 100 or less.

The content of component (A-2) is not particularly limited, but is preferably 0.1% by mass or more, more preferably 0.3% by mass or more, even more preferably 0.5% by mass or more, and still more preferably 0.7% by mass or more, based on the total mass of all organopolysiloxane components included in the curable silicone composition of the present disclosure. The content of component (A-2) is also preferably 50% by mass or less, more preferably 40% by mass or less, even more preferably 30% by mass or less, and in particular is preferably 25% by mass or less, based on the total mass of all organopolysiloxane components.

(B) Linear organopolysiloxane or cerium-containing organopolysiloxane, in which aryl groups account for no more than 30 mol % of all silicon atom-bonded functional groups.

Component (B) is an organopolysiloxane component contained in an amount of no more than 2% by mass based on the total mass of all organopolysiloxane components, comprising a linear organopolysiloxane or a cerium-containing organopolysiloxane, in which aryl groups account for no more than 30 mol % of all silicon atom-bonded functional groups. Component (B) may be one kind of linear alkenyl group-containing organopolysiloxane or cerium-containing organopolysiloxane, or a mixture of two or more kinds of linear alkenyl group-containing organopolysiloxanes or cerium-containing organopolysiloxanes.

Examples of aryl groups in the linear organopolysiloxane component of component (B) include, but are not particularly limited to, the same examples given for component (A), specifically, $C_{6-20}$ aryl groups, such as phenyl, tolyl, xylyl, and naphthyl groups, and preferably phenyl groups.

The proportion of aryl groups in all silicon atom-bonded functional groups in the linear organopolysiloxane component of component (B) is no more than 30 mol %, preferably no more than 25 mol %, and more preferably no more than 20 mol %. The proportion of aryl groups in all silicon atom-bonded functional groups in the linear organopolysiloxane component of component (B) may also be 0 mol %. The proportion of aryl groups in all silicon atom-bonded functional groups can be determined by analysis such as Fourier transform infrared spectrophotometry (FT-IR) or nuclear magnetic resonance (NMR). The organopolysiloxane component of component (B) may also optionally contain no silicon atom-bonded aryl groups.

The number-average molecular weight of the linear organopolysiloxane component of component (B) is preferably 500 or more, more preferably 700 or more, and even more preferably 1,000 or more, and preferably no more than 100,000. The number-average molecular weight can be determined by GPC.

In one embodiment, the linear organopolysiloxane component of component (B) of the present disclosure can be represented by formula (IV):

$$R^4_3SiO(R^4_2SiO)_nSiR^4_3$$

(in the formula, $R^4$ is a hydrogen atom or an optionally halogen-substituted monovalent hydrocarbon group, but no more than 30 mol % of $R^4$ are aryl groups, and n is an integer of 5 to 1,000).

Examples of optionally halogen-substituted monovalent hydrocarbon groups of $R^4$ in formula (IV) include: $C_{1-12}$ alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; $C_{6-20}$ aryl groups such as phenyl, tolyl, xylyl, and naphthyl groups; $C_{7-20}$ aralkyl groups such as benzyl, phenethyl, and phenylpropyl groups; $C_{2-12}$ alkenyl groups such as vinyl, allyl, butenyl, pentenyl, hexenyl, heptenyl, octenyl, nonenyl, decenyl, undecenyl, and dodecenyl groups; and any of these groups in which some or all of the hydrogen atoms are substituted with halogen atoms such as fluorine, chlorine, and bromine atoms. $R^4$ may also be a hydroxyl group or an alkoxy group such as methoxy or ethoxy, in small amounts, provided that the object of the present disclosure is not thereby compromised. $R^4$ is preferably selected from among hydrogen atoms, $C_{1-6}$ alkyl groups, particularly methyl, $C_{2-6}$ alkenyl groups, particularly vinyl, or $C_{6-20}$ aryl groups, particularly phenyl groups.

The linear organopolysiloxane component of component (B) in the present disclosure can include at least an alkenyl group-containing organopolysiloxane containing at least two silicon atom-bonded alkenyl groups per molecule, specifically, can include a linear alkenyl group-containing organopolysiloxane represented by formula (V):

$$R^1_3SiO(R^2_2SiO)_mSiR^1_3$$

(in the formula, $R^1$ is the same as in formula (I), but at least 2 $R^1$ per molecule are alkenyl groups, no more than 30 mol % of $R^1$ are aryl groups, and m is an integer of 5 to 1,000).

The proportion of alkenyl groups in all silicon atom-bonded functional groups in the alkenyl group-containing organopolysiloxane that is the linear organopolysiloxane component of component (B) is not particularly limited, but is preferably 0.001 mol % or more, more preferably 0.01 mol % or more, and even more preferably 0.1 mol % or more, and is, for example, 30 mol % or less, preferably 20 mol % or less, more preferably 10 mol % or less. The content of alkenyl groups can be calculated as the mol % of vinyl groups when all alkenyl groups are substituted with vinyl groups, and can be determined, for example, by analysis such as Fourier transform infrared spectrophotometry (FT-IR) or nuclear magnetic resonance (NMR), or by the method of titration noted above.

In an embodiment of the present disclosure, the alkenyl group-containing organopolysiloxane of formula (V) is preferably a linear organopolysiloxane in which both ends of the molecular chain are blocked with alkenyl groups, and specifically, can be represented by the following formula (VI)

$$R^2R^3_2SiO(R^3_2SiO)mSiOR^3_2R^2 \quad \text{formula (VI):}$$

(in the formula, $R^2$ is an alkenyl group, $R^3$ is the same as in formula (III), but $R^3$ represents aryl groups in an amount such that aryl groups account for no more than 30 mol % of all silicon atom-bonded functional groups, and m is an integer of 5 to 1,000).

Examples of alkenyl groups include $C_{2-12}$ alkenyl groups such as vinyl, allyl, butenyl, pentenyl, hexenyl, heptenyl, octenyl, nonenyl, decenyl, undecenyl, and dodecenyl groups; $C_{2-6}$ alkenyl groups are preferred, and vinyl groups are particularly preferred.

In formulas (V) and (VI), m is 5 or more, and preferably 10 or more, and is 1,000 or less, preferably 900 or less, and more preferably 800 or less.

In another embodiment of the present disclosure, the linear organopolysiloxane component of component (B) can include a linear organohydrogenpolysiloxane containing at least two silicon atom-bonded hydrogen atoms per molecule, and specifically can include a linear organohydrogenpolysiloxane represented by formula (XI):

$$R^9_3SiO(R^9_2SiO)mSiR^9_3$$

(in the formula, $R^9$ is a hydrogen atom or an optionally halogen-substituted monovalent hydrocarbon group other than an alkenyl group, but at least two $R^9$ per molecule are hydrogen atoms, no more than 30 mol % of $R^9$ is aryl groups, and m is an integer of 5 to 500).

Examples of optionally halogen-substituted monovalent hydrocarbon groups other than alkenyl groups $R^9$ in formula (XI) include $C_{1-12}$ alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; $C_{6-20}$ aryl groups such as phenyl, tolyl, xylyl, and naphthyl groups; $C_{7-20}$ aralkyl groups such as benzyl, phenethyl, and phenylpropyl groups; and any of these groups in which some or all of the hydrogen atoms are substituted with halogen atoms such as fluorine, chlorine, and bromine atoms.

In formula (XI), m is 5 or more, and preferably 10 or more, and is 500 or less, preferably 300 or less, and more preferably 100 or less.

The linear organohydrogenpolysiloxane component of component (B) may contain silicon atom-bonded hydrogen atoms at the molecular chain terminals or may contain silicon atom-bonded hydrogen atoms in molecular side chains. Examples of linear organohydrogenpolysiloxanes in component (B) include: dimethylpolysiloxane capped at both ends with dimethylhydrogensiloxy groups, dimethylsiloxane-methylphenylsiloxane copolymers capped at both ends with dimethylhydrogensiloxy groups, dimethylsiloxane-methylhydrogensiloxane copolymers capped at both ends with dimethylhydrogensiloxy groups, methylhydrogenpolysiloxane capped at both ends with trimethylsiloxy groups, and dimethylsiloxane-methylhydrogensiloxane copolymers capped at both ends with trimethylsiloxy groups.

In a preferred embodiment of the present disclosure, the linear organopolysiloxane component of component (B) may contain at least one dimethylsiloxane unit in structural units.

Component (B) of the present disclosure can also be a cerium-containing polysiloxane. Cerium-containing organopolysiloxane component (B) is obtained, for example, by a reaction between cerium chloride or a cerium salt of a carboxylic acid and an alkali metal salt of a silanol group-containing organopolysiloxane. Thus, as used in the present specification, the term "cerium-containing organopolysiloxane" can mean one that is obtained by reacting a silanol group-containing organopolysiloxane and a cerium salt, where the silanol group of the organopolysiloxane and the cerium atom are chemically bonded. Cerium-containing polysiloxane component (B) can preferably be a cerium-containing dimethylpolysiloxane containing a dimethylsiloxane unit in the polysiloxane.

Examples of the cerium salt of a carboxylic acid include cerium 2-ethylhexanoate, cerium naphthenate, cerium oleate, cerium laurate, and cerium stearate. An example of a cerium chloride is cerium trichloride.

Examples of alkali metal salts of silanol group-containing organopolysiloxanes include potassium salts of diorganopolysiloxanes capped at both ends with silanol groups, sodium salts of diorganopolysiloxanes capped at both ends with silanol groups, potassium salts of diorganopolysiloxanes capped at one end with a silanol group and capped at the other end with a triorganosiloxy group, and sodium salts of diorganopolysiloxanes capped at one end with a silanol group and capped at the other end with a triorganosiloxy group. Examples of silicon atom-bonded groups in these organopolysiloxanes include $C_{1-12}$ alkyl groups such as methyl, ethyl, propyl, isopropyl, n-butyl, isobutyl, tert-butyl, n-pentyl, neopentyl, hexyl, cyclohexyl, heptyl, octyl, nonyl, decyl, undecyl, and dodecyl groups; $C_{6-20}$ aryl groups such as phenyl, tolyl, xylyl, and naphthyl groups; $C_{7-20}$ aralkyl groups such as benzyl, phenethyl, and phenylpropyl groups; and any of these groups in which some or all of the hydrogen atoms are substituted with halogen atoms such as fluorine, chlorine, or bromine atoms.

The above reaction is carried out at room temperature or while heated in an alcohol such as methanol, ethanol, isopropanol, or butanol, an aromatic hydrocarbon such as toluene or xylene, an aliphatic hydrocarbon such as hexane or heptane, or an organic solvent such as mineral spirits, ligroin, or a petroleum ether. The resulting reaction product is preferably treated by distilling off organic solvents or low-boiling components or filtering off sediments as needed. A dialkyl formamide, hexa-alkyl phosphoamide, or the like may also be added to facilitate the reaction. The cerium atom content of the cerium-containing organopolysiloxane thus obtained is preferably within the range of 0.1 to 15% by mass.

In the curable silicone composition of the present disclosure, the organopolysiloxane content of component (B) is no more than 2% by mass, preferably no more than 1.5% by mass, and even more preferably no more than 1.3% by mass, based on the total mass of all organopolysiloxane components in the composition. The curable silicone composition of the present disclosure preferably contains component (B) in an amount of 0.001% by mass or more, and more preferably 0.01% by mass or more, based on the total mass of all organopolysiloxane components in the composition.

(C) Organohydrogenpolysiloxane including at least 2 silicon atom-bonded hydrogen atoms per molecule, that is different from component (B)

The curable silicone composition of the present disclosure contains, as component (C), a cross linker organohydrogenpolysiloxane including at least 2 silicon atom-bonded hydrogen atoms per molecule, that is different from component (B). Just 1 kind of organohydrogenpolysiloxane, or a combination of 2 or more kinds of organohydrogenpolysiloxanes, may be used as organohydrogenpolysiloxane component (C). Examples of the molecular structure of such organohydrogenpolysiloxanes include linear, linear with some branching, branched, cyclic, and three-dimensional network structures, where linear or branched structures are preferred.

The silicon atom-bonded hydrogen atoms of organohydrogenpolysiloxane component (C) may include silicon atom-bonded hydrogen atoms at the molecular terminals or in side chains other than the molecular terminals. Examples of silicon atom-bonded groups other than the hydrogen atoms in organohydrogenpolysiloxane component (C) include monovalent hydrocarbon groups, specifically, $C_{1-12}$ alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; $C_{6-20}$ aryl groups such as phenyl, tolyl, xylyl, and naphthyl groups; $C_{7-20}$ aralkyl groups such as benzyl, phenethyl, and phenylpropyl groups; and any of these groups in which some or all of the hydrogen atoms are substituted with halogen atoms such as fluorine, chlorine, and bromine atoms. The silicon atoms in organohydrogenpolysiloxane component (C) may also have a small quantity of hydroxyl groups or alkoxy groups such as methoxy or ethoxy groups, provided that the object of the present disclosure is not thereby compromised.

Examples of this kind of component (C) include dimethylpolysiloxane capped at both ends with dimethylhydrogensiloxy groups, dimethylsiloxane-methylphenylsiloxane copolymers capped at both ends with dimethylhydrogensiloxy groups, dimethylsiloxane-methylhydrogensiloxane copolymers capped at both ends with dimethylhydrogensiloxy groups, methylhydrogenpolysiloxane capped at both ends with trimethylsiloxy groups, dimethylsiloxane-methylhydrogensiloxane copolymers capped at both ends with trimethylsiloxy groups, organopolysiloxanes consisting of $H(CH_3)_2SiO_{1/2}$ units and $SiO_{4/2}$ units, and organopolysiloxanes consisting of $H(CH_3)_2SiO_{1/2}$ units, $(CH_3)_3SiO_{1/2}$ units, and $SiO_{4/2}$ units.

In one embodiment, organohydrogenpolysiloxane component (C) can include linear organohydrogenpolysiloxanes represented by the following average structural formula (VII):

$$R^6{}_2R^5SiO(R^6{}_2SiO)_mSiR^6{}_2R^5$$

(in formula (VII), $R^6$ is each independently an optionally halogen-substituted monovalent hydrocarbon group other than alkenyl groups, $R^5$ is a hydrogen atom, and m is an integer of 1 to 100).

Examples of $R^6$ optionally halogen-substituted monovalent hydrocarbon groups other than alkenyl groups in formula (VII) of component (C) include $C_{1-12}$ alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; $C_{6-20}$ aryl groups such as phenyl, tolyl, xylyl, and naphthyl groups; $C_{7-20}$ aralkyl groups such as benzyl, phenethyl, and phenylpropyl groups; and any of these groups in which some or all of the hydrogen atoms are substituted with halogen atoms such as fluorine, chlorine, and bromine atoms. $R^6$ may also be a hydroxyl group or an alkoxy group such as methoxy or ethoxy, in small amounts, provided that the object of the present disclosure is not thereby compromised. Preferred examples of alkyl groups represented by X include $C_{1-3}$ alkyl groups, specifically, methyl, ethyl, and propyl groups. $R^6$ is preferably selected from among $C_{1-12}$ alkyl groups, particularly methyl, or $C_{6-20}$ aryl groups, particularly phenyl.

In formula (VII), m is preferably 50 or less, more preferably 30 or less, even more preferably 10 or less, preferentially 5 or less, and in particular is preferably 3 or less.

In one embodiment, organohydrogenpolysiloxane component (C) may preferably include a resinous organohydrogenpolysiloxane represented by the following average unit formula/average structural formula (VIII):

$$(R^6{}_2R^5SiO_{1/2})_a(R^6{}_2SiO_{2/2})_bR^6SiO_{3/2})_c(SiO_{4/2})_d(XO_{1/2})_e$$

(in formula (VIII), $R^6$ is each independently an optionally halogen-substituted monovalent hydrocarbon group other than an alkenyl group, $R^5$ is a hydrogen atom, X is a hydrogen atom or an alkyl group, and a, b, c, d, and e are numbers satisfying the following: $0 \le a \le 1.0$, $0 \le b \le 1.0$, $0 \le c < 0.9$, $0 \le d < 0.5$, $0 \le e < 0.4$, $a+b+c+d=1.0$, and $c+d>0$.

In formula (VIII) for component (C), $R^6$ can be selected from the same as for $R^6$ in formula (VII).

In formula (VIII), a is preferably in the range of $0.1 \le a \le 0.9$, more preferably in the range of $0.2 \le a \le 0.8$, and particularly in the range of $0.3 \le a \le 0.7$. In formula (VIII), b is preferably in the range of $0 \le b \le 0.5$, more preferably in the range of $0 \le b \le 0.3$, and particularly in the range of $0 \le b \le 0.1$. In formula (VIII), c is preferably in the range of $0.1 \le c \le 0.9$, more preferably in the range of $0.2 \le c \le 0.8$, and particularly in the range of $0.3 \le c \le 0.7$. In formula (VIII), d is preferably in the range of $0 \le d \le 0.4$, more preferably in the range of $0 \le c1 \le 0.3$, and even more preferably in the range of $0 \le c1 \le 0.1$. In formula (VIII), e is preferably in the range of $0 \le e \le 0.3$, more preferably in the range of $0 \le e \le 0.2$, and particularly in the range of $0 \le e \le 0.1$.

In one embodiment, the resinous organohydrogenpolysiloxane of formula (VIII) includes M units and T units. In another embodiment, the resinous organohydrogenpolysiloxane of formula (VIII) consists of only M units and T units, that is, b and d in formula (VIII) are 0.

Organohydrogenpolysiloxane component (C) preferably contains aryl groups as silicon atom-bonding functional groups. In a preferred embodiment of the present disclosure, organohydrogenpolysiloxane component (C) has aryl groups in molecular side chains and no terminal aryl groups. The proportion of aryl groups in all silicon atom-bonded functional groups of organohydrogenpolysiloxane component (C) is not particularly limited, but is preferably 5 mol % or more, more preferably 10 mol % or more, even more preferably 15 mol % or more, and is in particular preferably 20 mol % or more of all silicon atom-bonded functional groups, and is preferably no more than 50 mol %, more preferably no more than 45 mol %, even more preferably no more than 40 mol %, and is in particular preferably no more than 35 mol % of all silicon atom-bonded functional groups.

The number-average molecular weight of organohydrogenpolysiloxane component (C) is not particularly limited, but is usually 100 to 1000, preferably 100 to 750, and more preferably 100 to 500. The number-average molecular weight can be determined by GPC.

The amount of organohydrogenpolysiloxane component (C) is not particularly limited, but is preferably more than 3% by mass, more preferably 10% by mass or more, and even more preferably 15% by mass or more, based on the total mass of all organopolysiloxane components contained in the curable silicone composition according to the present disclosure. The content of organohydrogenpolysiloxane component (C) is preferably no more than 50 mass %, more preferably no more than 40 mass %, even more preferably no more than 35 mass %, and is in particular preferably no more than 30 mass %, based on the total mass of the organopolysiloxane components.

In another embodiment, the content of organohydrogenpolysiloxane component (C) can be, for example, an amount resulting in 0.1 to 10 mols, preferably 0.5 to 5 mols, and in particular 0.8 to 2.5 mols of silicon atom-bonded hydrogen atoms in the organopolysiloxane components per mol of silicon atom-bonded alkenyl groups in the curable silicone composition. The content of silicon atom-bonded hydrogen atoms in component (C) can be, for example, determined by analysis such as Fourier transform infrared spectrophotometry (FT-IR) or nuclear magnetic resonance (NMR).

(D) Curing Catalyst

The curable silicone composition of the present disclosure can contain, as component (D), a curing catalyst for curing the organopolysiloxane components contained in the composition. The curable silicone composition according to the present disclosure may comprise one type of curing catalyst (D), and may contain two or more types of curing catalyst (D).

Curing catalyst component (D) is a hydrosilylation reaction catalyst for accelerating the curing of hydrosilylation reaction-curable type silicone compositions when the curing mechanism of the curable silicone composition of the present disclosure is a hydrosilylation reaction curing type. Examples of component (D) are platinum catalysts such as chloroplatinic acid, alcohol solution of chloroplatinic acid, platinum-olefin complex, platinum-1,3-divinyl-1,1,3,3-tetramethyldisiloxane complex, and platinum-supporting powder; palladium catalysts such as tetrakis(triphenylphosphine)palladium, and mixtures of triphenylphosphine and palladium black; and rhodium catalysts, and platinum catalysts are particularly preferable.

Component (D) is blended in a catalytic amount that is needed to cure the organopolysiloxane components of the present composition, and is not particularly limited, but when a platinum catalyst is used, for example, the amount of platinum metal contained in the platinum catalyst is preferably in the range of 0.01 to 1000 ppm for practical purposes, and is in particular preferably in the range of 0.1 to 500 ppm, by weight unit, in the silicone composition.

(E) Other Organopolysiloxane Components

The curable silicone composition according to the present disclosure can also include other organopolysiloxane components in addition to the organopolysiloxane components noted above.

(Epoxy Group-Containing Resinous Organopolysiloxanes)

The curable silicone composition according to the present disclosure may comprise an epoxy group-containing resinous organopolysiloxane as the other organopolysiloxane component. The curable silicone composition according to the present disclosure may comprise one type of epoxy group-containing resinous organopolysiloxane, or may comprise two or more types of epoxy group-containing resinous organopolysiloxanes.

The epoxy group-containing resinous organopolysiloxane contains epoxy group-containing organic groups as the silicon atom-bonding functional groups, and can also contain optionally halogen-substituted monovalent hydrocarbon groups. Examples of optionally halogen-substituted monovalent hydrocarbon groups include the same ones noted above. Examples of the epoxy group-containing organic groups include: glycidoxy alkyl groups such as a 2-glycidoxyethyl, 3-glycidoxypropyl, and 4-glycidoxybutyl groups; epoxycycloalkyl alkyl groups such as 2-(3,4-epoxycylohexyl)-ethyl and 3-(3,4-epoxycylohexyl)-propyl groups; and epoxyalkyl groups such as a 3,4-epoxybutyl and 7,8-epoxyoctyl groups; glycidoxyalkyl groups are preferable, 3-glycidoxypropyl is particularly preferable.

In one embodiment, the epoxy group-containing resinous organopolysiloxane of the present disclosure includes resinous organopolysiloxanes represented by formula (IX):

$$(R^7{}_3SiO_{1/2})a(R^7{}_2SiO_{1/2})b(R^7SiO_{3/2})c(SiO_{4/2})d(XO_{1/2})e$$

(in the formula, $R^7$ indicates the same or different optionally halogen-substituted monovalent hydrocarbon groups or epoxy group-containing organic groups, but at least one $R^7$ per molecule is an epoxy group-containing organic group, X is a hydrogen atom or an alkyl group, and a, b, c, d, and e are numbers satisfying the following: $0\leq a\leq 1.0$, $0\leq b\leq 1.0$, $0\leq c<0.9$, $0\leq d<0.5$, $0\leq e<0.4$, $a=b=c=d=10.0$, and $c+d>0$).

In formula (IX), $R^7$ is selected from among $C_{1-12}$ alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; $C_{6-20}$ aryl groups such as phenyl, tolyl, xylyl, and naphthyl groups; $C_{2-12}$ alkenyl groups such as vinyl, allyl, butenyl, pentenyl, hexenyl, heptenyl, octenyl, nonenyl, decenyl, undecenyl, and dodecenyl groups; any of these groups in which some or all of the hydrogen atoms are substituted with halogen atoms such as fluorine, chlorine, and bromine atoms; and epoxy group-containing organic groups.

In a preferred embodiment, the epoxy group-containing organopolysiloxane of formula (IX) includes an alkenyl group in $R^7$, and more preferably an alkenyl group in $R^7$ of the $(R^7{}_3SiO_{1/2})$ unit. The proportion of alkenyl groups in all silicon atom-bonded functional groups of the epoxy group-containing resinous organopolysiloxane is not particularly limited, but is preferably 0.01 mol % or more, more preferably 0.1 mol % or more, and even more preferably 0.2 mol % or more, and is, for example, no more than 30 mol %, preferably no more than 20 mol %, and more preferably no more than 10 mol %. The content of alkenyl groups can be calculated as the mol % of vinyl groups when all alkenyl groups are substituted with vinyl groups, and can be determined, for example, by analysis such as Fourier transform infrared spectrophotometry (FT-IR) or nuclear magnetic resonance (NMR).

In a preferred embodiment, the epoxy group-containing resinous organopolysiloxane of formula (IX) includes an epoxy group-containing organic group in $R^7$ of the $(R^7{}_2SiO_{2/2})$ unit. The proportion of epoxy group-containing organic groups in all silicon atom-bonded functional groups of the epoxy group-containing resinous organopolysiloxane is not particularly limited, but is preferably 0.1 mol % or more, more preferably 1 mol % or more, and even more preferably 5 mol % or more, and is, for example, no more than 50 mol %, preferably no more than 40 mol %, and more preferably no more than 30 mol %. The amount of the epoxy group-containing organic group can be determined by analysis such as Fourier transform infrared spectrophotometry (FT-IR) or nuclear magnetic resonance (NMR).

In formula (IX), a is preferably in the range of $0\leq a\leq 0.8$, more preferably in the range of $0.05\leq a\leq 0.6$, and particularly in the range of $0.1\leq a\leq 0.4$. In formula (IX), b is preferably in the range of $0\leq b\leq 0.9$, more preferably in the range of $0.1\leq b\leq 0.7$, and particularly in the range of $0.2\leq b\leq 0.5$. In formula (IX), c is preferably in the range of $0\leq c\leq 0.85$, more preferably in the range of $0.2\leq c\leq 0.75$, and particularly in the range of $0.3\leq c\leq 0.7$. In formula (IX), d is preferably in the range of $0\leq c1\leq 0.45$, more preferably in the range of $0\leq d\leq 0.4$, and even more preferably in the range of $0\leq d\leq 0.3$. In formula (IX), e is preferably in the range of $0\leq e\leq 0.3$, more preferably in the range of $0\leq e\leq 0.2$, and particularly in the range of $0\leq e\leq 0.1$.

In one embodiment of the present disclosure, when the curable silicone composition of the present disclosure contains an epoxy group-containing resinous organopolysiloxane, the content of the resinous organopolysiloxane is not particularly limited, but is, for example, preferably 0.1% by mass or more, more preferably 0.5% by mass or more, and even more preferably 1% by mass or more, and is preferably no more than 20% by mass, more preferably no more than 10% by mass, and even more preferably no more than 5% by mass, based on the total mass of all organopolysiloxane components in the composition.

(Cyclic Organopolysiloxane)

In one embodiment, the curable silicone composition according to the present disclosure may include a cyclic organosiloxane, and this cyclic organosiloxane can be represented by the following unit formula (X):

$$(R^8{}_2SiO)_n \qquad \text{Unit formula (X):}$$

In the formula, $R^8$ are each independently an optionally halogen-substituted monovalent hydrocarbon group, and n is a number resulting in a viscosity of 1000 mPa or less at 25° C. The viscosity can be determined using a rotary viscometer in accordance with JIS K7117-1.

In formula (X), examples of the optionally halogen-substituted monovalent hydrocarbon groups of $R^8$ include: $C_{1-12}$ alkyl groups such as methyl, ethyl, propyl, isopropyl, butyl, isobutyl, tert-butyl, pentyl, neopentyl, hexyl, cyclohexyl, heptyl, octyl, nonyl, decyl, undecyl, and dodecyl groups; $C_{6-20}$ aryl groups such as phenyl, tolyl, xylyl, and naphthyl groups; $C_{7-20}$ aralkyl groups such as benzyl, phenethyl, and phenylpropyl groups; $C_{2-12}$ alkenyl groups such as vinyl, allyl, butenyl, pentenyl, hexenyl, heptenyl, octenyl, nonenyl, decenyl, undecenyl, and dodecenyl groups; and any of these groups in which some or all of the hydrogen atoms are substituted with halogen atoms such as fluorine, chlorine, and bromine atoms. $R^8$ may also be a hydroxyl group or an alkoxy group such as methoxy or ethoxy, in small amounts, provided that this does not adversely affect the aim of the present disclosure.

According to an embodiment, the cyclic organopolysiloxane may include at least two alkenyl groups per molecule. When the cyclic organopolysiloxane includes alkenyl groups in the silicon atom-bonded organic groups, the proportion of alkenyl groups in all silicon atom-bonded organic groups is not particularly limited, but is, for example, 10 mol % or more, preferably 20 mol % or more, and more preferably 30 mol % or more. The proportion of alkenyl groups in all silicon atom-bonded organic groups of the additional cyclic organopolysiloxane is also, for example, no more than 80 mol %, preferably no more than 70 mol %, and more preferably no more than 60 mol %.

The cyclic organopolysiloxane content is not particularly limited, but when the curable silicone composition of the present disclosure includes a cyclic organopolysiloxane, the content is preferably 0.01% by mass or more, more preferably 0.05% by mass or more, and even more preferably 0.1% by mass or more based on the total mass of all organopolysiloxane components, and is also no more than 30% by mass, preferably no more than 20% by mass, and more preferably no more than 10% by mass based on the total mass of all organopolysiloxane components.

(F) Pigments

The curable silicone composition according to the disclosure can include a pigment as component (F). The pigment (F) may comprise one kind of pigment (F), or may comprise two or more kinds of pigment (F).

Examples of pigments (F) include silica; metal oxides such as titanium oxide, aluminium oxide, zinc oxide, zirconium oxide and magnesium oxide; hollow fillers such as glass balloons and glass beads; as well as barium sulfate, zinc sulfate, barium titanate, aluminium nitride, boron nitride, and antimony oxide. Examples of the black pigments include iron oxide, aniline black, activated carbon, graphite, carbon nanotubes, and on black.

The pigment (F) may furthermore be surface-treated in order to enhance reflectance and light resistance. Examples of types of surface treatments include well-known surface treatments such as treatment with aluminium oxide, aluminium hydroxide, silica, zinc oxide, zirconium oxide, organic compounds, and siloxanes. The organic compounds are not particularly limited, and examples include polyhydric alcohols, alkanolamines or derivatives thereof, organosilicon compounds such as organic siloxanes, higher fatty acids or metal salts thereof, organometallic compounds, and the like. The method of surface treatment is not particularly limited and can be any known method; examples of methods that can be used include (1) methods in which a pigment that has already been surface treated is mixed into the silicone composition, and (2) methods in which a surface treatment agent is added separately from the pigment into the silicone composition and is reacted with the pigment in the composition.

The average particle size and configuration of component (F) are not particularly limited, but the primary particle size is preferably in the range of 1 nm to 50 μm. In the present specification, the average particle size means the 50% integrated value of the particle size distribution, as determined by laser diffraction/scattering.

In the present composition, the content of component (F) is not particularly limited, but is preferably 0.01 parts by mass to 30 parts by mass per total 100 parts by mass of organopolysiloxane components.

Optional components can be blended into the curable silicone composition of the present disclosure, provided that the object of the present disclosure is not thereby compromised. Examples of optional components include acetylene compounds, organic phosphorus compounds, vinyl group-containing siloxane compounds, and hydrosilylation reaction inhibitors, curing retarders, inorganic fillers other than pigments, or inorganic fillers that have undergone a surface hydrophobic treatment with an organosilicon compound, surface treatment agents of powder or surfactants, organopolysiloxanes containing no silicon atom-bonded hydrogen atoms or silicon atom-bonded alkenyl groups, tackifiers, releasing agents, metallic soap, agents that impart heat resistance, agents that impart cold resistance, thermally conductive fillers, agents that impart flame retardance, agents that impart thixotropic properties, fluorescent substances, and solvents.

Hydrosilylation inhibitors are components for suppressing the hydrosilylation of the silicone composition; specific examples include acetylene-based reaction inhibitors such as ethynylcyclohexanol, and reaction inhibitors based on amines, carboxylic acid esters, and phosphite esters, etc. A reaction inhibitor is usually added in an amount of 0.001 to 5% by mass of the total composition.

Examples of the curing retarder include: alkyne alcohols such as 2-methyl-3-butyn-2-ol, 3,5-dimethyl-1-hexyn-3-ol, 2-phenyl-3-butyn-2-ol, 1-ethynyl-1-cyclohexanol; enyne compounds such as 3-methyl-3-penten-1-yne and 3,5-dimethyl-3-hexen-1-yne; alkenyl group-containing low-molecular weight siloxanes such as tetramethyltetravinylcyclotetrasiloxane and tetramethyltetrahexenylcyclotetrasiloxane; and alkynyloxysilanes such as methyl-tris(1,1-dimethylpropynyloxy) silane and vinyl-tris(1,1-dimethylpropynyloxy) silane. The content of the curing retarder is not limited but is preferably in the range of 10 to 10000 ppm in terms of mass units, with respect to the present composition.

Examples of inorganic fillers include: metal oxide particles such as fumed silica, crystalline silica, precipitated silica, silsesquioxane, magnesium oxide, iron oxide, talc, mica, diatomous earth and glass beads; inorganic fillers such as aluminium hydroxide, magnesium carbonate, calcium carbonate and zinc carbonate; fibrous fillers such as glass fibre; and fillers such as these fillers that have undergone a surface hydrophobic treatment with an organosilicon compound such as an organoalkoxysilane compound, an organochlorosilane compound, an organosilazane compound, or a low molecular weight siloxane compound. Silicone rubber powder, silicone resin powder and the like can also be incorporated. The inorganic filler may be blended in an amount of 40% by mass or less, preferably 30% by mass or less, more preferably 20% by mass or less, and particularly 10% by mass or less, of the composition.

The surface treatment agent of powder is not particularly limited, and examples include organosilazanes, organocyclosiloxanes, organochlorosilanes, organoalkoxysilanes, low molecular weight linear siloxanes, organic compounds and the like. Herein, examples of the organic compound include polyhydric alcohols, alkanolamines or derivatives thereof, organic silicon compounds such as organic siloxane, higher fatty acids or metal salts thereof, organic metal complexes, organometallic complexes, fluorine-based organic compounds, anionic surfactants, cationic surfactants, nonionic surfactants, and the like.

The curable silicone composition of the present disclosure can be prepared by mixing the components. The method of mixing the components may be a conventionally known method, and is not particularly limited, and a uniform mixture is usually obtained by simple mixing. When solid components such as inorganic filler are included as an optional component, it is preferable to use a mixing device for the mixing. There are no particular limitations regarding this mixing device, and examples include single- and twin-screw continuous mixers, double roller mixers, Ross mixers, Hobart mixers, dental mixers, planetary mixers, kneader mixers, Henschel mixers, and the like.

Encapsulant

The present disclosure also relates to an encapsulant comprising the curable silicone composition of the present disclosure. The encapsulant of the present disclosure is an encapsulant for an optical semiconductor. The configuration of the encapsulant of the present disclosure is not particularly limited, but is preferably in the form of a film or sheet. The present disclosure therefore also relates to a film obtained by solidifying the curable silicone composition of the present disclosure. The film of the present disclosure can be preferably used as an encapsulant in the form of a film for encapsulating a semiconductor element. The semiconductor that is to be sealed with the encapsulant or film of the present disclosure is not particularly limited, and examples include semiconductors of SiC or GaN, for example, or optical semiconductors such as light emitting diodes.

The encapsulant or film according to the present disclosure comprises the curable silicone composition of the present disclosure and thus allows an optical semiconductor to be sealed with a cured product that has a smooth surface on which wrinkling has been prevented.

Optical Semiconductor Device

The optical semiconductor device of the present disclosure comprises an optical semiconductor element that is sealed with the encapsulant of the present disclosure. In other words, an optical semiconductor element is sealed, coated, or adhered by means of the cured product of the curable silicone composition of the present disclosure. Examples of optical semiconductor elements include light-emitting diodes (LED), semiconductor lasers, photodiodes, phototransistors, solid-state imaging, and light emitters and light receivers for photocouplers; light-emitting diodes (LED) are especially preferred.

Light-emitting diodes (LEDs) emit light from the upper, lower, left and right sides of the optical semiconductor element, and so it is undesirable for parts constituting the light-emitting diode (LED) to absorb light, and materials having high light transmittance or high reflectance are preferred for said parts. Consequently, the substrate on which the optical semiconductor element is mounted also preferably comprises a material of high light transmittance or high reflectance. Examples of substrates on which to mount the optical semiconductor element include conductive metals such as silver, gold, and copper; non-conductive metals such as aluminium and nickel; thermoplastic resins mixed with white pigments such as PPA and LCP; thermosetting resins containing white pigments such as epoxy resins, BT resins, polyimide resins, and silicone resins; and ceramics such as alumina and alumina nitride.

EXAMPLES

The UV curable silicone composition of the present disclosure is described in greater detail by means of the following examples and comparative examples.

The starting material components shown below were used in the following examples and comparative examples. Below, Me denotes methyl groups, Vi denotes vinyl groups, Ph denotes phenyl groups, and Ep denotes 3-glycidoxypropyl groups.

Component a-1: Resinous alkenyl group-containing organopolysiloxane represented by average unit formula $(ViMe_2SiO_{1/s})_{25}$ $(PhSiO_{3/2})_{75}$; phenyl groups account for 50 mol % of all silicon atom-bonded functional groups.

Component a-2-1: Linear organopolysiloxane capped at both terminals with alkenyl groups, represented by average structural formula $ViMe_2SiO(PhMeSiO)_{25}SiMe_2Vi$; phenyl groups account for 44.6 mol % of all silicon atom-bonded functional groups Component a-2-2: Organopolysiloxane represented by average structural formula $ViMe_2SiO(Me_2SiO)_{60}(Ph_2SiO)_{30}SiMe_2Vi$; phenyl groups account for 32.3 mol % of all silicon atom-bonded functional groups Component b-1: Linear organopolysiloxane capped at both terminals with alkenyl groups, represented by average structural formula $ViMe_2SiO(Me_2SiO)_{150}SiMe_2Vi$; phenyl groups account for 0 mol % of all silicon atom-bonded functional groups Component b-2: Linear organopolysiloxane capped at both terminals with alkenyl groups, represented by average structural formula $ViMe_2SiO(Me_2SiO)_{310}SiMe_2Vi$; phenyl groups account for 0 mol % of all silicon atom-bonded functional groups Component b-3: Linear organopolysiloxane capped at both terminals with alkenyl groups, represented by average structural formula $ViMe_2SiO(Me_2SiO)_{530}SiMe_2Vi$; phenyl groups account for 0 mol % of all silicon atom-bonded functional groups Component b-4: Linear organopolysiloxane containing alkenyl groups in side chains, represented by average structural formula $Me_3SiO(ViMeSiO)_7(Me_2SiO)_{800}SiMe_3$; phenyl groups account for 0 mol % of all silicon atom-bonded functional groups Component b-5: Linear organopolysiloxane capped at both terminals with alkenyl groups, represented by average structural formula $ViPh_2SiO(Me_2SiO)_{12}SiPh_2Vi$; phenyl groups account for 13.3 mol % of all silicon atom-bonded functional groups Component b-6: Linear organopolysiloxane capped at both terminals with alkenyl groups, represented by average structural formula $ViMe_2SiO(Me_2SiO)_{200}(Ph_2SiO)_{50}SiMe_2Vi$; phenyl groups account for 19.8 mol % of all silicon atom-bonded functional groups Component b-7: Linear organopolysiloxane capped at both terminals with hydrogensiloxy groups, represented by average structural formula $HMe_2SiO(Me_2SiO)_{20}SiMe_2H$; phenyl groups account for 0 mol % of all silicon atom-bonded functional groups Component b-8: Linear organopolysiloxane containing hydrogensiloxy groups in side chains, represented by average structural formula $Me_3SiO(HMeSiO)_{50}SiMe_3$; phenyl groups account for 0 mol % of all silicon atom-bonded functional groups Component b-9: Cerium-containing dimethylpolysiloxane; phenyl groups account for 0 mol % of all silicone atom-bonded functional groups Component b'-1: Organopolysiloxane represented by average unit formula $(Me_3SiO_{1/2})_{45}$ $(ViMe_2SiO_{1/2})_{15}$ $(SiO_{4/2})_{40}$ Component b'-2: Organopolysiloxane represented by average unit formula $(HMe_2SiO_{1/2})_4(SiO_{4/2})$ Component b'-3: Organopolysiloxane represented by average unit formula $(Me_2SiO_{2/2})(ViMeSiO_{2/2})(EpSiO_{3/2})$ Component b'-4: Bismalate Component b'-5: Organopolysiloxane represented by average unit unit $(ViMe_2SiO_{1/2})_3(MeSiO_{3/2})$ Component b'-6: Organopolysiloxane represented by average structural formula $ViMe_2SiO(Me_2SiO)_{60}(Ph_2SiO)_{30}SiMe_2Vi$ Component b'-7: Organopolysiloxane represented by average unit formula $(Me_3SiO_{1/2})_5(ViMe_2SiO_{1/2})_{17}(MeSiO_{3/2})_{39}(PhSiO_{3/2})_{39}$ Component c-1: Organohydrogenpolysiloxane represented by average structural formula $HMe_2SiO(Ph_2SiO)SiMe_2H$ Component c-2: Organohydrogenpolysiloxane represented by average unit formula $(HMe_2SiO_{1/2})_{60}(PhSiO_{3/2})_{40}$ Component d-1: Complex of 1,3-divinyl-1,1,3,3-tetramethyldisiloxane and platinum having a platinum concentration of 4.0% by mass Component e-1: Epoxy group- and alkenyl group-containing resinous organopolysiloxane represented by average unit formula $(ViMe_2SiO_{1/2})_{25}$ $(EpMeSiO_{2/2})_{40}(PhSiO_{3/2})_{75}$ Component e-2: Structural unit formula $(ViMeSiO_{2/2})_4$ Component f-1: Silica with an average primary particle size of 7 nm (brand name DM-30 by Tokuyama Corporation)

Component f-2: Carbon black with an average primary particle size of 280 nm (brand name N990 by Cancarb Limited)

Component f-3: Carbon black with an average primary particle size of 13 nm (brand name FW200 by Orion Engineered Carbons)

Component f-4: Glass bubbles with a median diameter of 18 μm (brand name iM30K by 3M)

Component g: Ethinylcyclohexanol

Preparation of Cured Product

The components were mixed in the proportions (% by mass) shown in Tables 1 through 6, and were stirred for 2 minutes at a vacuum of 1.8 Pa using a planetary stirring-defoaming device Mazerustar KK-VT300 by Kurabo Industries Ltd. The curable silicone compositions were coated to a thickness of 250 μm on glass plates (100 mm×100 mm) using a coater, placed in a heat circulation type of oven, held for 30 minutes at 150° C., and allowed to cool down to room temperature to produced cured products.

Evaluation

All compositions in the examples and comparative examples were assessed as follows for cured product surface smoothness and glass substrate wetting properties; the results are shown in Tables 1 through 6.

Surface Smoothness

The surfaces of the cured products that had been coated onto the glass plates were observed using a laser microscope (VK-X1000) by Keyence, where cured products with wrinkles on the surface were rated "x", and cured product with no wrinkles on the surface were rated as "○".

Glass Substrate Wetting Properties

The cured products that had been coated onto the glass plates were macroscopically observed, where cured products that were peeling off the glass were rated "x", and those with no peeling were rated as "○".

TABLE 1

| Component | Example 1 | Example 2 | Example 3 | Comparative Example 1 | Comparative Example 2 |
|---|---|---|---|---|---|
| a-1 | 66.9 | 66.9 | 66.9 | 66.9 | 66.9 |
| a-2-1 | 8.0 | 8.0 | 8.0 | 8.0 | 8.0 |
| b-1 | 0.3 | — | — | — | — |
| b-2 | — | 0.3 | — | — | — |
| b-3 | — | — | 0.3 | — | — |
| b'-1 | — | — | — | 0.3 | — |
| e-1 | 1.9 | 1.9 | 1.9 | 1.9 | 1.9 |
| c-1 | 22.9 | 22.9 | 22.9 | 22.9 | 22.9 |
| Total organopolysiloxane components | 100 | 100 | 100 | 100 | 100 |
| d-1 | 72 ppm | 72 ppm | 72 ppm | 72 ppm | 72 ppm |
| G | 0.05 | 0.05 | 0.05 | 0.05 | 0.05 |
| Evaluation | | | | | |
| Surface smoothness | ? | ? | ? | x | x |
| Glass substrate wetting properties | ? | ? | ? | x | x |

TABLE 2

| Component | Example 4 | Example 5 | Example 6 | Example 7 | Example 8 |
|---|---|---|---|---|---|
| a-1 | 66.9 | 66.9 | 66.9 | 66.9 | 66.9 |
| a-2-1 | 8.0 | 8.0 | 8.0 | 8.0 | 8.0 |
| b-1 | 0.3 | — | — | — | — |
| b-2 | — | 0.3 | — | — | — |
| b-3 | — | — | 0.3 | — | — |
| b-4 | — | — | — | 0.3 | — |
| 6-5 | — | — | — | — | 0.3 |
| e-1 | 1.9 | 1.9 | 1.9 | 1.9 | 2.1 |
| c-1 | 22.9 | 22.9 | 22.9 | 18.9 | 24.7 |
| Total organopolysiloxane components | 100 | 100 | 100 | 100 | 100 |
| d-1 | 72 ppm | 72 ppm | 72 ppm | 72 ppm | 8 ppm |
| f-1 | 0.58 | 0.58 | 0.58 | 0.58 | 0.06 |
| f-2 | 0.58 | 0.58 | 0.58 | 0.58 | 0.06 |
| G | 0.05 | 0.05 | 0.05 | 0.05 | 0.05 |
| Evaluation | | | | | |
| Surface smoothness | ? | ? | ? | ? | ? |
| Glass substrate wetting properties | ? | ? | ? | ? | ? |

TABLE 3

| Component | Example 9 | Example 10 | Example 11 | Example 12 | Example 13 |
|---|---|---|---|---|---|
| a-1 | 66.9 | 66.9 | 66.9 | 56.6 | 72.3 |
| a-2-1 | 8.0 | 8.0 | 8.0 | 21.9 | 0.80 |
| b-1 | — | — | — | 0.58 | 0.06 |
| b-6 | 0.3 | — | — | — | — |
| b-7 | — | 0.3 | — | — | — |
| b-8 | — | — | 0.3 | — | — |
| e-1 | 1.9 | 1.9 | 1.9 | 1.9 | 2.1 |
| c-1 | 22.9 | 22.9 | 22.9 | 18.9 | 24.7 |
| Total organopolysiloxane components | 100 | 100 | 100 | 100 | 100 |
| d-1 | 72 ppm | 72 ppm | 72 ppm | 72 ppm | 8 ppm |
| f-1 | 0.58 | 0.58 | 0.58 | 0.58 | 0.06 |
| f-2 | 0.58 | 0.58 | 0.58 | 0.58 | 0.06 |
| G | 0.05 | 0.05 | 0.05 | 0.05 | 0.05 |

TABLE 3-continued

| Component | Example 9 | Example 10 | Example 11 | Example 12 | Example 13 |
|---|---|---|---|---|---|
| Evaluation | | | | | |
| Surface smoothness | ? | ? | ? | ? | ? |
| Glass substrate wetting properties | ? | ? | ? | ? | ? |

TABLE 6

| Component | Comparative Example 8 | Comparative Example 9 | Comparative Example 10 | Comparative Example 11 | Comparative Example 12 |
|---|---|---|---|---|---|
| a-1 | 66.9 | 66.9 | 66.9 | 66.9 | 66.9 |
| a-2-1 | 8.0 | 8.0 | 8.0 | 8.0 | 8.3 |
| b'-4 | 0.3 | — | — | — | — |
| b'-5 | — | 0.3 | — | — | — |
| b'-6 | — | — | 0.3 | — | — |

TABLE 4

| Component | Example 14 | Example 15 | Example 16 | Example 17 | Example 18 | Example 19 | Example 20 |
|---|---|---|---|---|---|---|---|
| a-1 | 67.1 | 66.3 | 66.9 | 66.9 | 63.8 | 57.9 | 56.8 |
| a-2-1 | 8.0 | 8.0 | 8.0 | 8.0 | 12.2 | — | 17.4 |
| a-2-2 | — | — | — | — | — | 18.0 | — |
| b-2 | 0.1 | 1.0 | 0.3 | 0.3 | 0.1 | — | 0.3 |
| b-9 | — | — | — | — | — | 1.0 | 1.0 |
| e-1 | 1.9 | 1.9 | 1.9 | 1.9 | 2.2 | 2.5 | 2.3 |
| e-2 | — | — | — | — | — | 0.2 | 0.2 |
| c-1 | 22.9 | 22.8 | 22.9 | 22.9 | 21.7 | 20.3 | 19.7 |
| c-2 | — | — | — | — | — | — | 2.3 |
| Total organopoly siloxane components | 100 | 100 | 100 | 100 | 100 | 100 | 100 |
| d-1 | 72 ppm | 72 ppm | 72 ppm | 72 ppm | 38 ppm | 53 ppm | 72 ppm |
| f-1 | 0.58 | 0.58 | 0.58 | 0.58 | 0.09 | 0.58 | 0.67 |
| f-2 | 0.58 | 0.58 | 5.80 | — | 0.55 | 1.00 | 1.00 |
| f-3 | — | — | — | 0.58 | — | — | |
| f-4 | — | — | — | — | 8.8 | — | — |
| G | 0.05 | 0.05 | 0.05 | 0.05 | 0.05 | 0.03 | 0.05 |
| Evaluation | | | | | | | |
| Surface smoothness | ○ | ○ | ○ | ○ | ○ | ○ | ○ |
| Glass substrate wetting properties | ○ | ○ | ○ | ○ | ○ | ○ | ○ |

TABLE 5

| Component | Comparative Example 3 | Comparative Example 4 | Comparative Example 5 | Comparative Example 6 | Comparative Example 7 |
|---|---|---|---|---|---|
| a-1 | 65.1 | 63.5 | 66.9 | 66.9 | 66.9 |
| a-2-1 | 7.5 | 7.5 | 8.0 | 8.0 | 8.0 |
| b-2 | 2.90 | 4.84 | — | — | — |
| b'-1 | — | — | 0.3 | — | — |
| b'-2 | — | — | — | 0.3 | — |
| b'-3 | — | — | — | — | 0.3 |
| e-1 | 1.9 | 1.9 | 1.9 | 1.9 | 1.9 |
| c-1 | 22.6 | 22.2 | 22.9 | 22.9 | 22.9 |
| Total organopolysiloxane components | 100 | 100 | 100 | 100 | 100 |
| D | 72 ppm | 72 ppm | 72 ppm | 72 ppm | 72 ppm |
| f-1 | 0.58 | 0.58 | 0.58 | 0.58 | 0.58 |
| f-2 | 0.58 | 0.58 | 0.58 | 0.58 | 0.58 |
| G | 0.05 | 0.05 | 0.05 | 0.05 | 0.05 |
| Evaluation | | | | | |
| Surface smoothness | x | x | x | ? | x |
| Glass substrate wetting properties | x | x | x | x | x |

TABLE 6-continued

| Component | Comparative Example 8 | Comparative Example 9 | Comparative Example 10 | Comparative Example 11 | Comparative Example 12 |
|---|---|---|---|---|---|
| b'-7 | — | — | — | 0.3 | — |
| e-1 | 1.9 | 1.9 | 1.9 | 1.9 | 1.9 |
| c-1 | 22.9 | 22.9 | 22.9 | 22.9 | 22.9 |
| Total organopolysiloxane components | 100 | 100 | 100 | 100 | 100 |
| D | 72 ppm | 72 ppm | 72 ppm | 72 ppm | 72 ppm |
| f-1 | 0.58 | 0.58 | 0.58 | 0.58 | 0.58 |
| f-2 | 0.58 | 0.58 | 0.58 | 0.58 | 0.58 |
| G | 0.05 | 0.05 | 0.05 | 0.05 | 0.05 |
| Evaluation | | | | | |
| Surface smoothness | x | x | x | x | x |
| Glass substrate wetting properties | x | x | x | x | x |

The above results show that the curable silicone compositions of Examples 1 through 20 of the present disclosure were capable of forming cured products that had a smooth surface configuration on which wrinkling had been prevented. The curable silicone compositions of Examples 1 to 20 of the present disclosure also had exceptional wetting properties on glass substrates.

INDUSTRIAL APPLICABILITY

The curable silicone composition of the present disclosure is particularly useful as an encapsulating material for optical semiconductor devices, such as light emitting diodes (LEDs), semiconductor lasers, photodiodes, phototransistors, solid-state imaging, and light emitters and light receivers for photocouplers, etc.

The invention claimed is:

1. A curable silicone composition independently comprising:

(A-1) a resinous alkenyl group-containing organopolysiloxane in which aryl groups account for more than 30 mol % of all silicon atom-bonded groups;

(A-2) a linear alkenyl group-containing organopolysiloxane in which aryl groups account for more than 30 mol % of all silicon atom-bonded groups;

(B) a linear organopolysiloxane in which aryl groups are present and account for no more than 20 mol % of all silicon atom-bonded groups, contained in an amount of 0.01% by mass or more, but no more than 2% by mass based on the total mass of all organopolysiloxane components, with the linear organopolysiloxane of component (B) represented by formula (V);

$$R^1_3SiO(R^1_2SiO)_mSiR^1_3 \quad (V),$$

wherein, in formula (V), $R^1$ is an optionally halogen-substituted monovalent hydrocarbon group, but at least two $R^1$ per molecule are alkenyl groups, no more than 20 mol % of $R^1$ are aryl groups, and m is an integer of 10 to 1,000; and (C) an organohydrogenpolysiloxane including at least 2 silicon atom-bonded hydrogen atoms per molecule, in which aryl groups account for more than 20 mol % of all silicon atom-bonded groups; and (D) a catalyst for hydrosilylation reaction, wherein organopolysiloxane component (B) has a number-average molecular weight of 500 or more, wherein component (A-1) has no terminal aryl groups, wherein the content of organopolysiloxane components (A-1) and (A-2) is 30 to 90% by mass based on the total mass of all organopolysiloxane components in the composition, and wherein the content of organopolysiloxane component (A-1) is 30% by mass or more based on the total mass of all organopolysiloxane components.

2. The curable silicone composition according to claim 1, wherein the content of organopolysiloxane component (A-2) is 30% by mass or more and to 50% by mass or less based on the total mass of all organopolysiloxane components in the composition.

3. The curable silicone composition according to claim 1, wherein the content of organopolysiloxane component (B) is 1.5% by mass or less based on the total mass of all organopolysiloxane components.

4. The curable silicone composition according to claim 1, wherein organohydrogenpolysiloxane component (C) contains silicon atom-bonded aryl groups, and the aryl groups account for more than 20 to 50 mol % of all silicon atom-bonded groups of component (C).

5. The curable silicone composition according to claim 1, wherein the content of organohydrogenpolysiloxane component (C) is 5% by mass or more based on the total mass of all organopolysiloxane components.

6. An encapsulant, comprising the curable silicone composition according to claim 1.

7. An optical semiconductor device, equipped with the encapsulant according to claim 6.

8. The curable silicone composition according to claim 2, wherein the content of organopolysiloxane component (B) is 1.5% by mass or less based on the total mass of all organopolysiloxane components.

9. The curable silicone composition according to claim 2, wherein organohydrogenpolysiloxane component (C) contains silicon atom-bonded aryl groups, and the aryl groups account for more than 20 to 50 mol % of all silicon atom-bonded groups of component (C).

10. The curable silicone composition according to claim 3, wherein organohydrogenpolysiloxane component (C) contains silicon atom-bonded aryl groups, and the aryl groups account for more than 20 to 50 mol % of all silicon atom-bonded groups of component (C).

11. The curable silicone composition according to claim 2, wherein the content of organohydrogenpolysiloxane component (C) is 5% by mass or more based on the total mass of all organopolysiloxane components.

12. The curable silicone composition according to claim 3, wherein the content of organohydrogenpolysiloxane component (C) is 5% by mass or more based on the total mass of all organopolysiloxane components.

13. The curable silicone composition according to claim 4, wherein the content of organohydrogenpolysiloxane component (C) is 5% by mass or more based on the total mass of all organopolysiloxane components.

14. The curable silicone composition according to claim 1, wherein the content of organopolysiloxane component (A-1) is 55% by mass or more based on the total mass of all organopolysiloxane components.

15. The curable silicone composition according to claim 2, wherein the content of organopolysiloxane component (A-1) is 55% by mass or more based on the total mass of all organopolysiloxane components.

16. The curable silicone composition according to claim 14, wherein the content of organopolysiloxane component (A-1) is 75% by mass or less based on the total mass of all organopolysiloxane components.

17. A curable silicone composition independently comprising:

(A-1) a resinous alkenyl group-containing organopolysiloxane in which aryl groups account for more than 30 mol % of all silicon atom-bonded groups;

(A-2) a linear alkenyl group-containing organopolysiloxane in which aryl groups account for more than 30 mol % of all silicon atom-bonded groups;

(B) a linear organopolysiloxane in which aryl groups are present and account for no more than 20 mol % of all silicon atom-bonded groups, contained in an amount of 0.01% by mass or more, but no more than 2% by mass based on the total mass of all organopolysiloxane components, with the linear organopolysiloxane of component (B) represented by formula (V);

$$R^1_3SiO(R^1_2SiO)_mSiR^1_3 \quad (V),$$

wherein, in formula (V), $R^1$ is an optionally halogen-substituted monovalent hydrocarbon group, but at least two $R^1$ per molecule are alkenyl groups, no more than 20 mol % of $R^1$ are aryl groups, and m is an integer of 10 to 1,000; and (C) an organohydrogenpolysiloxane including at least 2 silicon atom-bonded hydrogen atoms per molecule, in which aryl groups account for more than 20 mol % of all silicon atom-bonded groups; and (D) a catalyst for hydrosilylation reaction, wherein organopolysiloxane component (B) has a number-average molecular weight of 500 or more, wherein component (A-1) has no terminal aryl groups, wherein the content of organopolysiloxane components (A-1) and (A-2) is 30 to 90% by mass based on the total mass of all organopolysiloxane components in the composition, and wherein the content of organopolysiloxane component (A-2) is 30% by mass or more and 50% by mass or less based on the total mass of all organopolysiloxane components.

18. The curable silicone composition according to claim 17, wherein the content of organopolysiloxane component (A-1) is from 55% to 75% by mass based on the total mass of all organopolysiloxane components.

* * * * *